(12) United States Patent
Liao et al.

(10) Patent No.: US 6,719,081 B2
(45) Date of Patent: Apr. 13, 2004

(54) ELECTRICAL BICYCLE WITH STEERING CONTROL BY BIASING THE BODY

(75) Inventors: Pen-Cuang Liao, Tai-Chung (TW); Chih-Hung Liang, Tai-Chung (TW); Chao-Ming Ko, Feng-Yuan (TW)

(73) Assignee: Taiwan Bicycle Industry R&D Center, Taichung (TW)

(*) Notice: Subject to any disclaimer, the term of this patent is extended or adjusted under 35 U.S.C. 154(b) by 0 days.

(21) Appl. No.: 10/167,303

(22) Filed: Jun. 12, 2002

(65) Prior Publication Data

US 2003/0230445 A1 Dec. 18, 2003

(51) Int. Cl.[7] ............................................. B62M 7/00
(52) U.S. Cl. ....................................... 180/220; 180/219

(58) Field of Search .................................. 180/219, 220; 280/267, 274, 278, 281.1, 287

(56) References Cited

U.S. PATENT DOCUMENTS 6,270,103 B1 * 8/2001 Grimm ........................ 280/270

* cited by examiner

*Primary Examiner*—Lesley D. Morris
*Assistant Examiner*—L. Lum
(74) *Attorney, Agent, or Firm*—Charles E. Baxley

(57) ABSTRACT

An electrical bicycle includes a front body unit, a rear body unit and a pivot coupler unit which couples the front body unit and the rear body unit. The coupler unit enables the front body unit to be turned relative to the rear body unit when the rider turns his or her body to shift his or her center of gravity.

15 Claims, 7 Drawing Sheets

ELECTRICAL BICYCLE WITH STEERING CONTROL BY BIASING THE BODY

BACKGROUND OF THE INVENTION

1. Field of the Invention

The present invention relates to bicycles and, more particularly, to an electrical bicycle, which enables the user to change the steering direction by biasing his or her body.

2. Description of the Related Art

A conventional bicycle, as shown in FIG. 1 is generally comprised of a head tube, a seat tube, a bottom bracket fixedly provided at the bottom side of the seat tube, a top tube and a down tube connected between the head tube and the seat tube, a handlebar and front fork assembly installed in the head tube to hold a front wheel, seat stays and chain stays backwardly extended from the seat tube and the bottom bracket, a rear wheel pivoted to the connection area between the seat stays and the chair stays, and a bottom bracket bearing axle, two pedal and crank assemblies respectively connected to the ends of the bottom bracket bearing axle, and a chain transmission mechanism coupled between the bottom bracket bearing axle and the rear wheel. When riding the bicycle, the rider pedals the pedal and crank assemblies to move the bicycle and operates the handlebars of the handlebar and front fork assembly to control the steering direction of the bicycle. There are known electrical bicycles in which a battery-operated motor drive is installed and controlled to rotate the front wheel (or rear wheel) of the bicycle. When operating these conventional bicycles, the rider controls the steering direction by means of operating the handlebars.

SUMMARY OF THE INVENTION

It is an object of the present invention to provide an electrical bicycle which enables the rider to control the steering direction of the bicycle by turning his or her body to change the center of gravity. It is another object of the present invention to provide an electrical bicycle which enables the rider to control the steering direction of the bicycle by turning his or her body to change the center of gravity with less effort than in a conventional bicycle. It is still another object of the present invention to provide an electrical bicycle which, which is durable in use. It is still another object of the present invention to provide an electrical bicycle, which is easy to assemble. It is still another object of the present invention to k provide an electrical bicycle, which has a receiving chamber for storing the battery module, tools, and parts. To achieve these and other objects of the present invention, the electrical bicycle comprises a front body unit, a rear body unit, and a pivot coupler unit coupled between the front body unit and the rear body unit for enabling the rider to control the direction of steering by twisting the body. The pivot coupler unit comprises a inverted T-shaped bar disposed vertically, a bottom bracket fixedly transversely fastened to a bottom side of the T-shaped bar, the bottom bracket having two ends fixedly connected to the rear body unit, a foot bar supported in the bottom bracket and protruded over two distal ends of the bottom bracket, a smoothly arched guard extended over the periphery of the T-shaped bar and fixedly fastened to the front body unit for enabling the front body unit and the rear body unit to be biased relative to each other, and a seat assembly coupled to a top end of the T-shaped bar.

DETAILED DESCRIPTION OF THE PREFERRED EMBODIMENT

Figure 1:
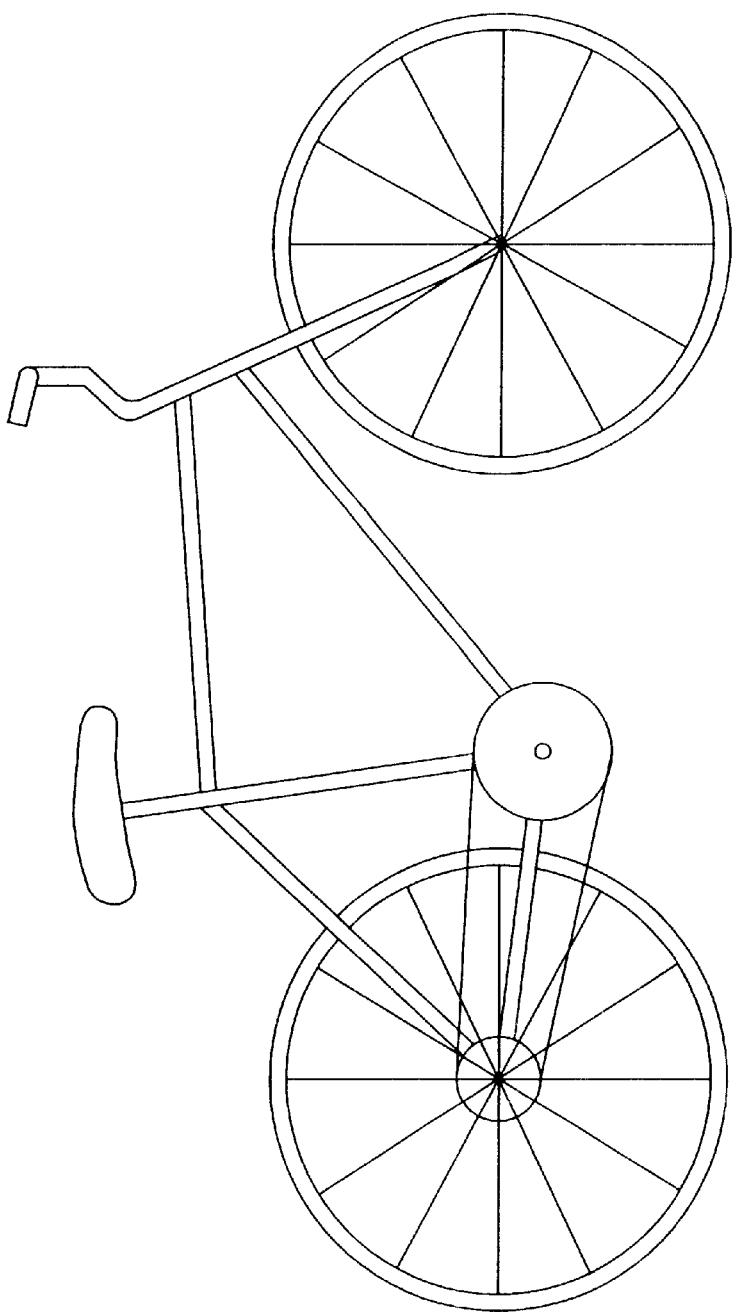
FIG. 1 is a schematic drawing showing the structure of a conventional bicycle.
Figure 2:
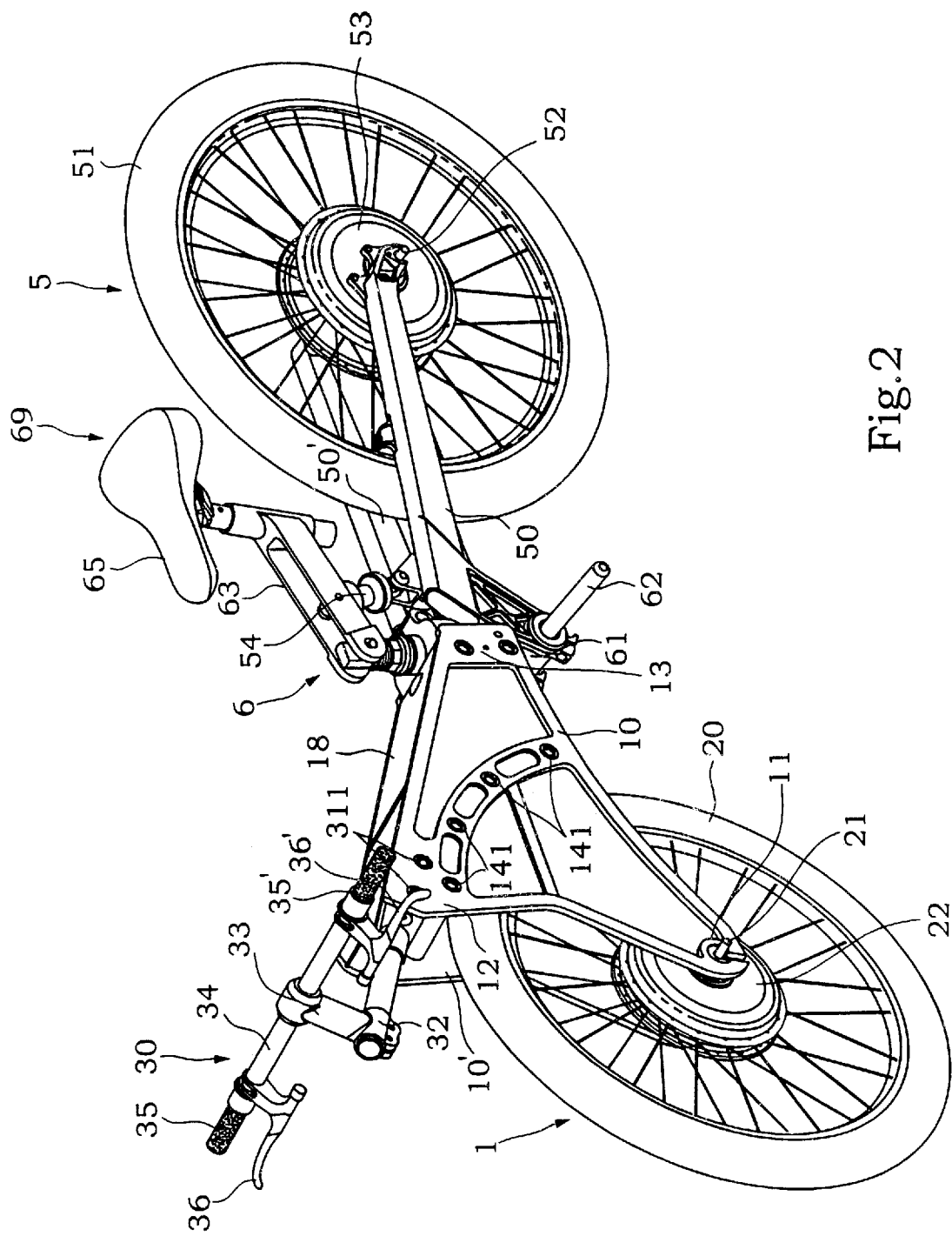
FIG. 2 is a perspective view of an electrical bicycle according to the present invention.

Referring to FIG. 2, an electrical bicycle in accordance with the present invention is shown comprised of a front body unit 1, a rear body unit 5, and a pivot coupler unit 6 coupled between the front body unit 1 and the rear body unit 5.

The pivot coupler unit 6 comprises a T-shaped bar 60 invertedly disposed in a vertical orientation, a bottom bracket 61 fixedly fastened to the bottom side of the T-shaped bar 60 in transverse direction, the bottom bracket 61 having two ends fixedly connected to the rear body unit 5, a foot bar 62 supported in the bottom bracket 60 and protruding over the ends of the bottom bracket 60, a smoothly arched guard 67 extending over the periphery of the T-shaped bar 60 and fixedly fastened with two ends thereof to the front body unit 1 for the purpose of enabling the front body unit 1 and the rear body unit 5 to be biased relative to each other, and a seat assembly 69 coupled to the top end of the invertedly disposed T-shaped bar 60, a seat tube 66 fastened to the other end of the support arm 63, and a saddle 65 supported on the seat tube 66.

Figure 3:
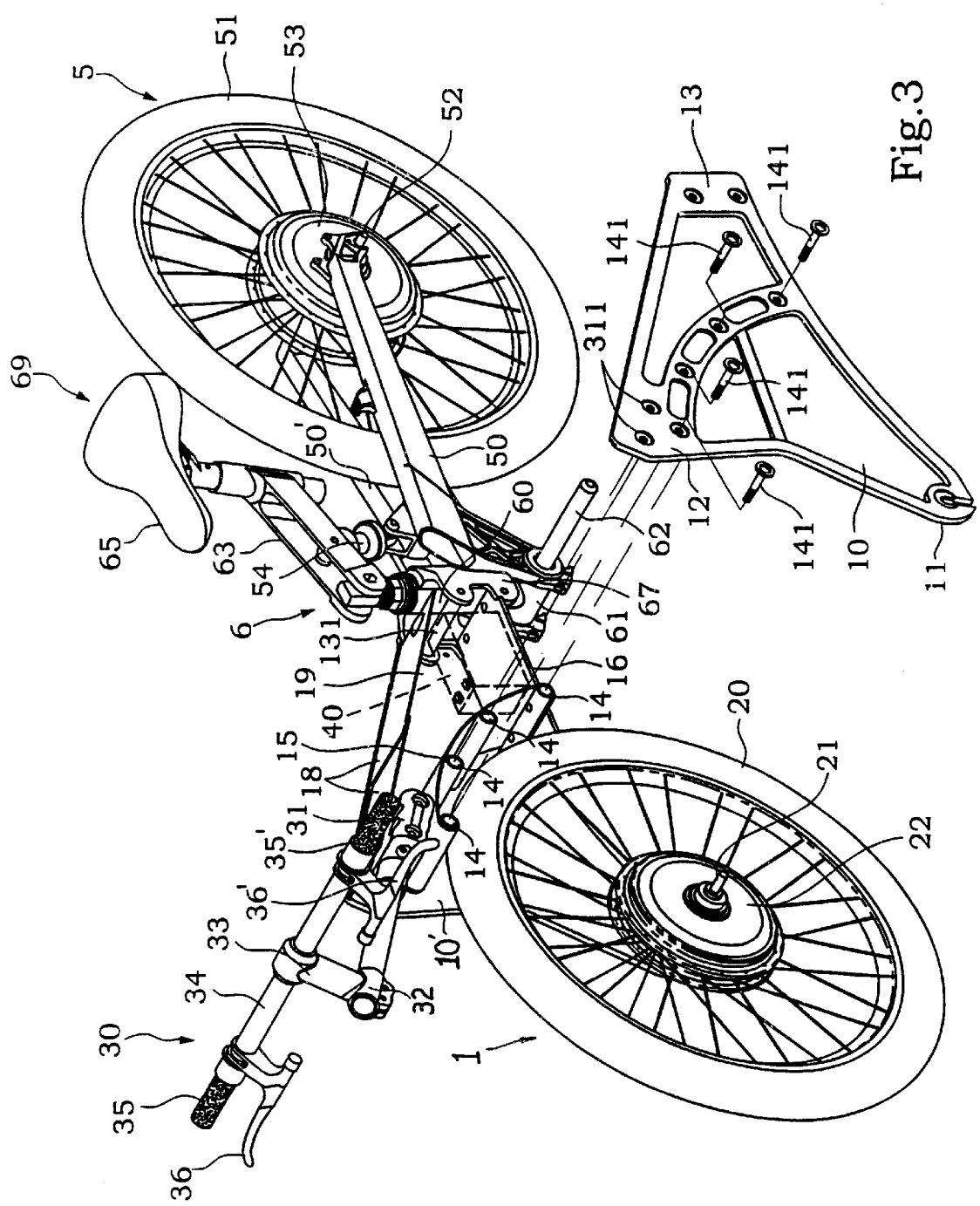
FIG. 3 is an exploded view of the electrical bicycle according to the present invention.
Figure 4:
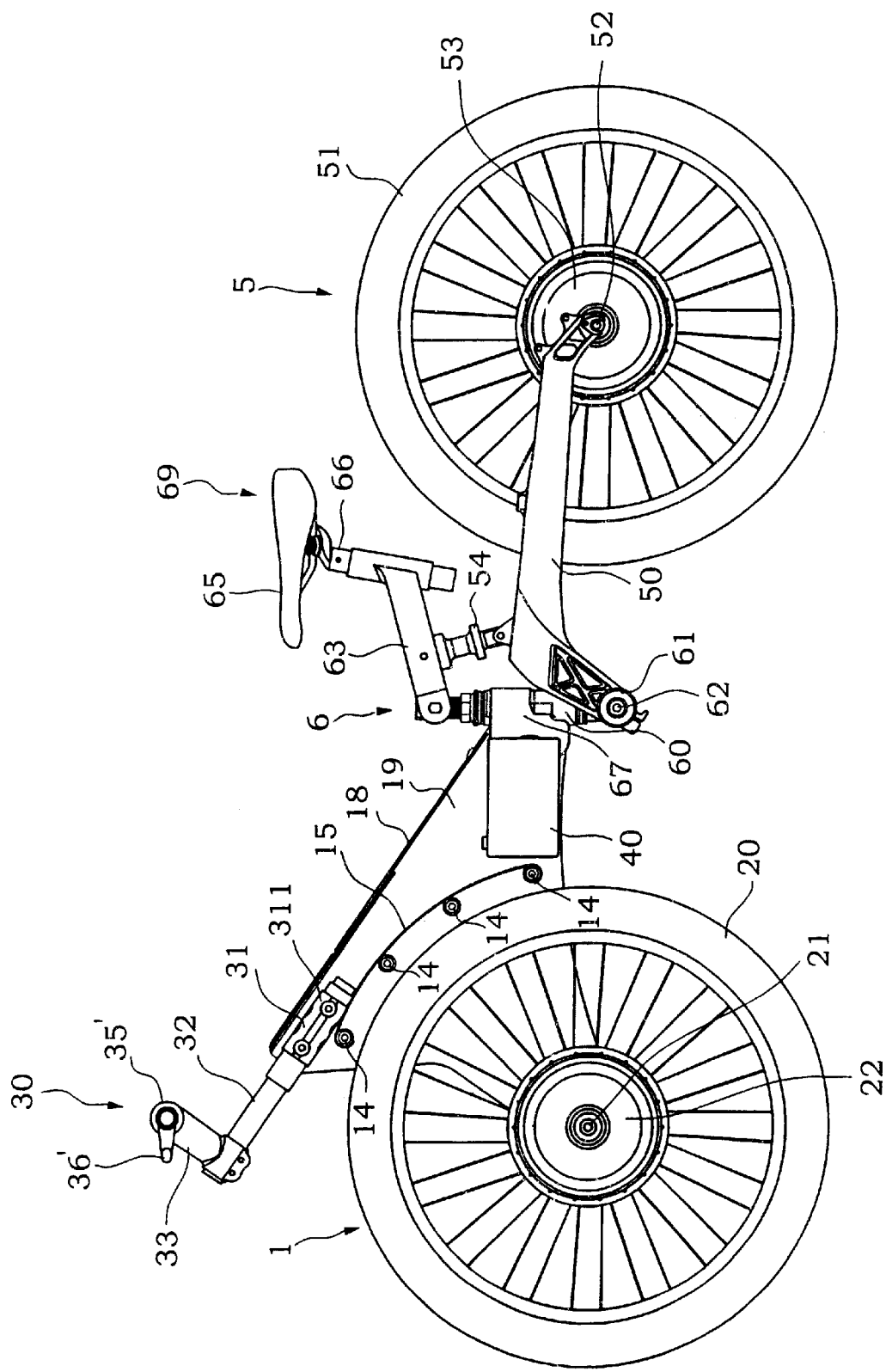
FIG. 4 is a plain view of the electrical bicycle according to the present invention.

Referring to FIGS. 2–4 the front body unit 1 comprises two triangular flat side frames 10;10'. The side frames 10;10' each have a front wheel coupling end 11 respectively connected to the ends of the wheel axle 21 of a front wheel 20, a top handlebar coupling end 12 respectively connected to a head assembly 30, and a rear coupling end 13 respectively connected to the ends of the guard 67 by connecting rods 131. A plurality of transverse rod members 14 are connected between the side frames 10;10' by screws 141 and arranged along an imaginary arched line around the periphery of the front wheel 20 to support a fender 15 for protection against splashing mud. The fender 15 has two distal ends rolled up and respectively hooked on the first and last (the top and bottom) transverse rod members 14. A bottom plate 16 is provided between the side frames 10;10' at the bottom side, having two distal ends respectively fixedly fastened to the last (bottom) transverse rod member 14 and the bottom-side connecting rod 131. The side frames 10;10', the fender 15, and the bottom plate 16 define a receiving chamber 19. A battery module 40 is installed in the receiving chamber 19 to provide the bicycle with the necessary working power. A sliding cover plate 18 is coupled to the side frames 10;10' at the top, and disposed to close/open the receiving chamber 19.

The aforesaid head assembly 30 comprises: a locating block 31 fixedly connected between the top handlebar coupling ends 12 of the side frames 10;10' by screws 311 and arranged in parallel to the sliding cover plate 18, a head tube 32 fixedly connected to and obliquely forwardly extended from the locating block 31, a handlebar stem 33 fixedly connected to the front end of the head tube 32, a handlebar 34 transversely supported on the handlebar stem 33 at the top, two grips 35;35' respectively provided at the ends of the handlebar 34 and two brake levers 36;36' respectively pivotally connected to the grips 35;35'.

Referring to FIGS. 2 through 4, the rear body unit 5 comprises two rear forks 50;50' bilaterally connected between the bottom bracket 61 of the pivot coupler unit 6 and the wheel axle 52 of a rear wheel 51, a shock-absorber 54 fixedly mounted between the rear forks 50;50' and coupled to the bottom side of the support arm 63 of the seat assembly 69 between the T-shaped 60 and the seat stem 66.

Figure 5:
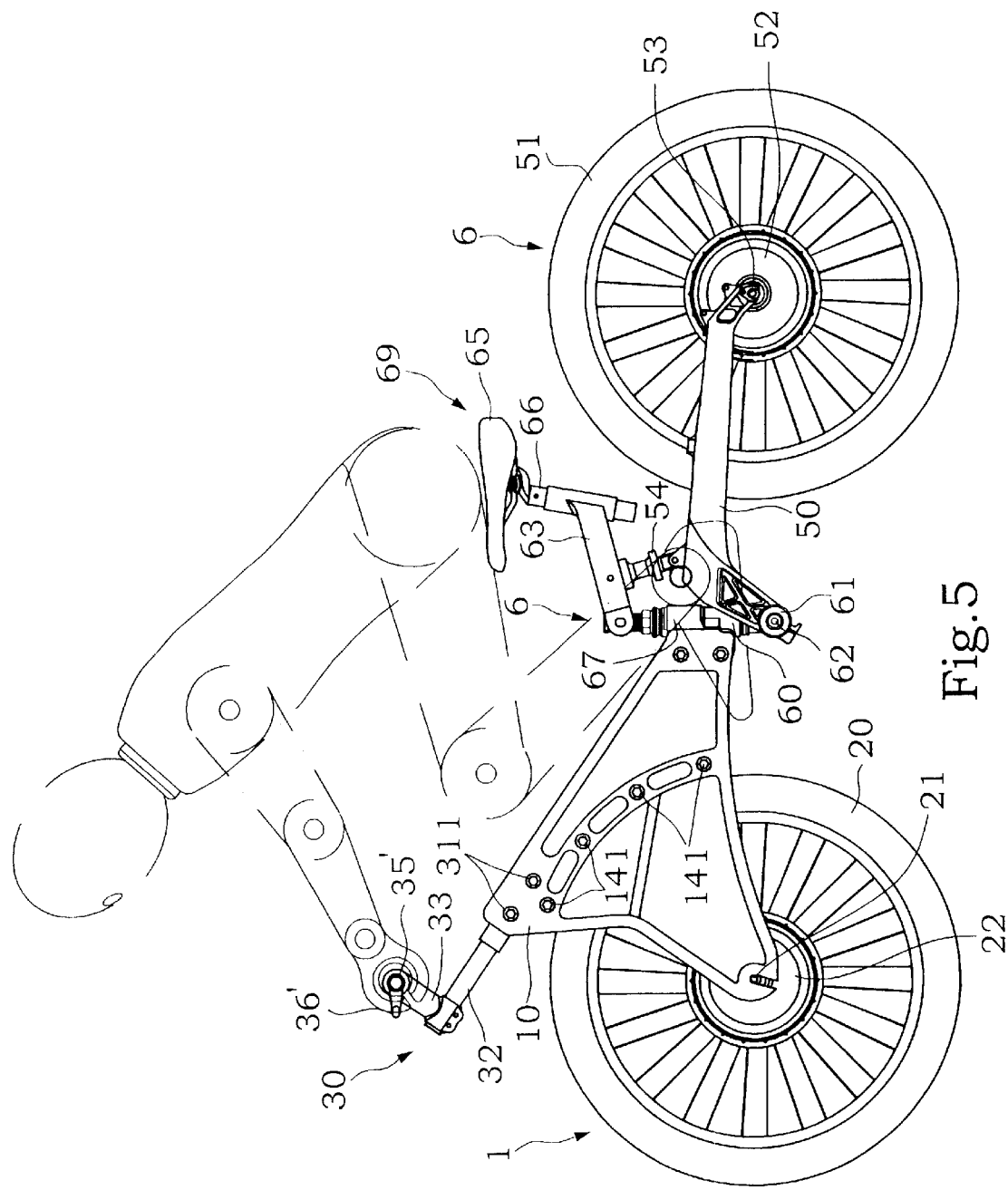
FIG. 5 is a schematic drawing showing a rider riding the electrical bicycle according to the present invention.

When riding the bicycle as illustrated in FIG. 5, the rider sits on the saddle 65 with the feet rested on the ends of the foot bar 62 and the hands holding the grips 35;35' and then the power switch (not shown) of the electrical bicycle is switched on enabling the rider to control the supply of batter power from the battery module 40 to the wheel hub motor 22 of the front wheel 20 or the wheel hub motor 53 of the rear wheel 51 to propel the electrical bicycle. During riding, the shock absorber 54 absorbs shocks, eliminating or reducing transmission of shocks to the saddle 65.

Figure 6:
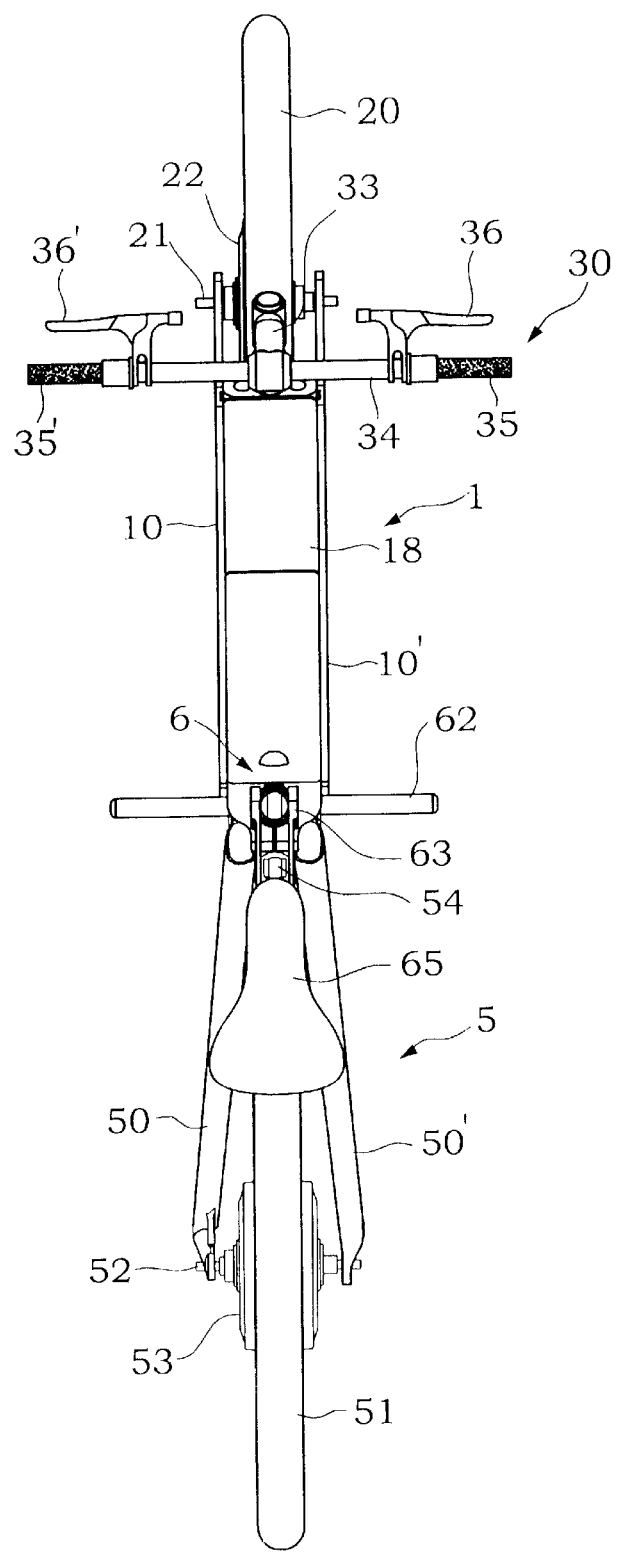
FIG. 6 is a top view of the present invention showing the front body unit and the rear body unit of the electrical bicycle aligned in a line.
Figure 7:
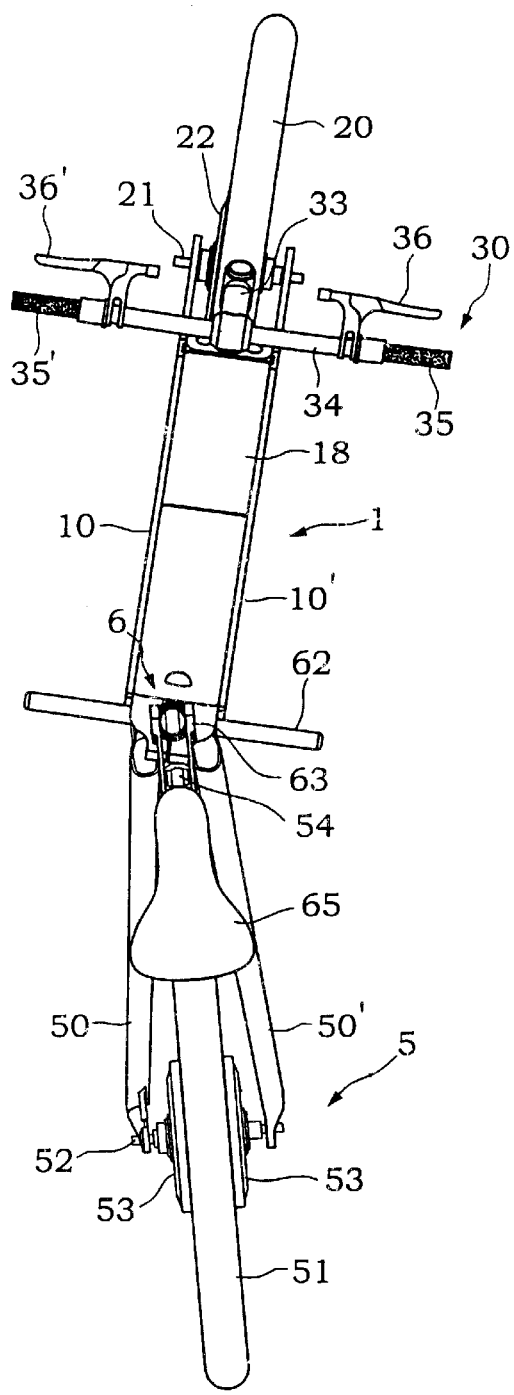
FIG. 7 is a top view of the present invention showing the front body unit turned to the right.
Figure 8:
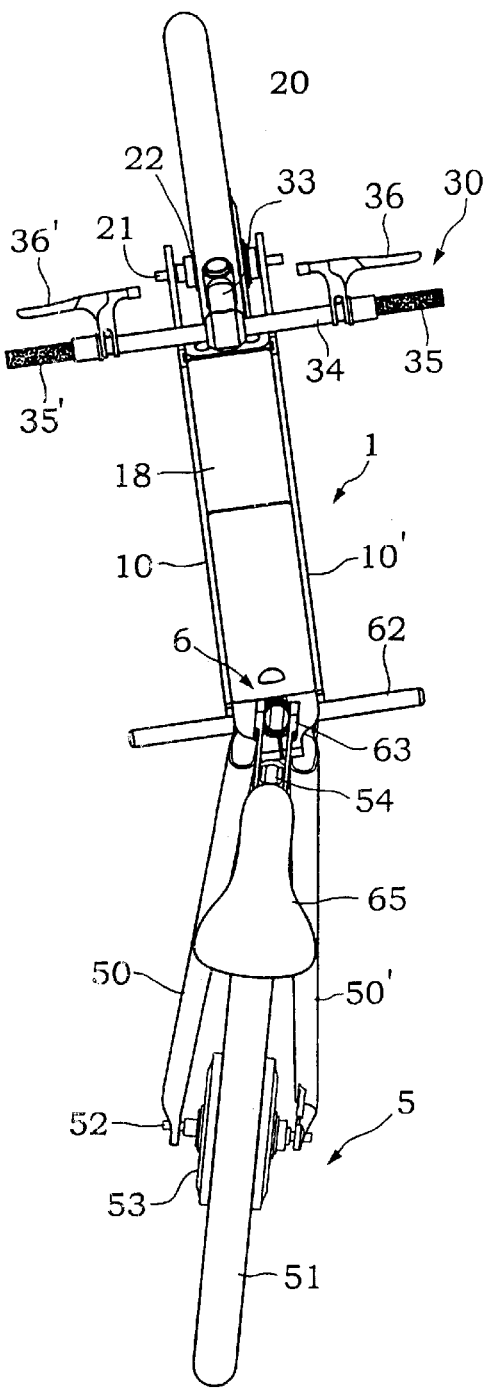
FIG. 8 is a top view of the present invention showing the front body unit turned to the left.

The steering control of the electrical bicycle is outlined hereinafter with reference to FIGS. 6 through 8. FIG. 6 illustrates the electrical bicycle running forward in a straight line. At this time, the rider keeps his or her body vertical and the center of gravity is at the electrical bicycle. The pivot coupler unit 6 keeps the front body unit 1 and the rear body unit 5 aligned. FIG. 7 illustrates the electrical bicycle turned rightwards. At this time, the rider's upper body is slightly twisted to the right, the center of gravity of the rider's body is shifted to the right side of the electrical bicycle. Due to the change of the center of gravity, the angular position of the front body unit 1 is changed relative to the rear body unit 5. When the rider twists his or her upper body to the left, the center of gravity is shifted to the left side, thereby causing the front body unit 1 to be turned to the left relative to the rear body unit 5 as shown in FIG. 8.

As indicated above, controlling the steering direction is not through the handlebar 34. Twisting the rider's body to change the center of gravity achieves the steering control. The grips 35;35' and the handlebar 34 are provided for the holding of the rider's hands and stabilizing the movement of the electrical bicycle but not for controlling the steering direction of the electrical bicycle. In order to let the rider control the steering of the electrical bicycle by twisting the body easily with less effort, the weight of the rear body unit 5 must be as low as possible. Further, the design of the front body unit 1 is strong. The user can easily install the front body unit 1. When the sliding cover plate 18 is open the user can access the inside of the receiving chamber 19 to maintain or pick up internal members. When the sliding cover plate 18 closed, it protects the internal members inside the receiving chamber 19.

While only one embodiment of the present invention has been shown and described, it will be understood that various modifications and changes could be made thereunto without departing from the spirit and scope of the invention disclosed.

What is claimed is:

1. An electrical bicycle comprising:
   a front body unit;
   a rear body unit; and
   a pivot coupler unit coupled between said front body unit and said rear body unit for enabling the rider to control the direction of steering by twisting the rider's body, said pivot coupler unit comprising, an inverted T-shaped bar disposed vertically, a bottom bracket fixedly transversely fastened to a bottom side of said T-bar, said bottom bracket having two ends fixedly connected to said rear body unit, a foot bar supported in said bottom bracket and protruded over two distal ends of said bottom bracket, a smoothly arched guard extended over the periphery of said T-shaped bar and fixedly fastened to said front body unit, with said pivot coupler unit for enabling said front body unit and said rear body unit to be biased relative to each other, and a seat assembly coupled to a top end of said T-shaped bar.

2. The electrical bicycle as claimed in claim 1, wherein when the center of gravity of the rider's body is at the electrical bicycle, said front body unit and said rear body unit are maintained aligned enabling the electrical bicycle to be moved forwardly in a straight line.

3. The electrical bicycle as claimed in claim 1, wherein when the rider's body is turned to shift the center of gravity to the right side of the electrical bicycle, said front body unit is turned rightwards relative to said rear body unit, thereby causing the electrical bicycle to turn right.

4. The electrical bicycle as claimed in claim 1, wherein when the body rider's body is turned to shift the center of gravity to the left side of the electrical bicycle, said front body unit is turned leftwards relative to said rear body unit, thereby causing the electrical bicycle to turn left.

5. The electrical bicycle as claimed in claim 1, wherein said front body unit comprises: two flat side frames connected in parallel, said flat side frames each having a front a front wheel coupling end, a top handlebar coupling end, and a rear coupling end respectively connected to two ends of said guard of said pivot coupler unit, a front wheel coupled between said flat side frames, said front wheel having a wheel axle connected between the front wheel coupling ends of said flat side frames, and a head assembly fastened to the top handlebar coupling ends of said flat side frames.

6. The electrical bicycles as claimed in claim 5, wherein said front body unit further comprises a fender connected between said flat side frames and spaced relative to said front wheel.

7. The electrical bicycle as claimed in claim 6, wherein said fender has an arched shape.

8. The electrical bicycle as claimed in claim 6, wherein said front body unit further comprises: a plurality of transverse rod members fixedly connected between said flat side frames at different elevations and equally spaced apart from of said front wheel to support said fender between said flat side frames.

9. The electrical bicycle as claimed in claim 5, wherein said front body unit further comprises: a bottom plate fixedly connected between said flat side frames at a bottom side and defining with said flat side frames and said guard of said pivot coupler unit a receiving chamber.

10. The electrical bicycle as claimed in claim 9, wherein said front body unit further comprises: a sliding cover plate coupled to said flat side frames at a top side and adapted for closing said receiving chamber.

11. The electrical bicycle as claimed in claim 5, wherein said head assembly of said front body unit comprises: a locating block fixedly connected between the top handlebar coupling ends of said flat side frames and arranged in parallel to said sliding cover plate, a head tube forwardly extended from said locating block, a handlebar stem fixedly connected to said head tube, and a handlebar transversely supported on said handlebar stem.

12. The electrical bicycle as claimed in claim 1, wherein said rear body unit comprises: a rear wheel, said rear wheel having a wheel axle and two rear forks bilaterally connected between the bottom bracket of said pivot coupler unit and the wheel axle of said rear wheel.

13. The electrical bicycle as claimed in claim 1 wherein said rear body unit comprises: a shock absorber which supports said seat assembly.

14. The electrical bicycle as claimed in claim 1, wherein said rear body unit comprises: an oblique support arm, said support arm having a lower front end connected to said T-shaped bar and an upper rear end, a seat tube fastened to the upper rear end of said support arm and a saddle supported on said seat tube.

15. The electrical bicycle as claimed in claim 14, wherein said shock absorber has a free end connected to a bottom side of said support arm.

* * * * *